(12) United States Patent
Shepelev et al.

(10) Patent No.: US 10,025,412 B2
(45) Date of Patent: Jul. 17, 2018

(54) IN-CELL LOW POWER MODES

(71) Applicant: Synaptics Incorporated, San Jose, CA (US)

(72) Inventors: Petr Shepelev, San Jose, CA (US); David S. Sabo, Scotts Valley, CA (US); Erol Eryilmaz, Los Altos Hills, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/187,220

(22) Filed: Feb. 21, 2014

(65) Prior Publication Data
US 2015/0103034 A1  Apr. 16, 2015

Related U.S. Application Data

(60) Provisional application No. 61/891,843, filed on Oct. 16, 2013.

(51) Int. Cl.
*G06F 3/041* (2006.01)
*G06F 3/044* (2006.01)

(52) U.S. Cl.
CPC ........... *G06F 3/0416* (2013.01); *G06F 3/044* (2013.01); *G06F 3/0412* (2013.01)

(58) Field of Classification Search
None
See application file for complete search history.

(56) References Cited

U.S. PATENT DOCUMENTS

| 7,737,957 | B2 | 6/2010 | Lee et al. |
| 8,125,456 | B2 | 2/2012 | Krah et al. |
| 8,174,503 | B2 | 5/2012 | Chin |
| 9,652,091 | B1* | 5/2017 | Obeidat ................. G06F 3/044 |
| 2004/0085351 | A1 | 5/2004 | Tokkonen |
| 2004/0088568 | A1 | 5/2004 | Tokkonen |
| 2004/0202969 | A1 | 10/2004 | Park et al. |

(Continued)

FOREIGN PATENT DOCUMENTS

| CN | 1902565 A | 1/2007 |
| JP | 2013123208 A | 6/2013 |
| WO | 2011126920 A2 | 10/2011 |

OTHER PUBLICATIONS

U.S. Appl. No. 13/631,784.
U.S. Appl. No. 14/091,171.
Written Opinion of the International Searching Authority, PCT/US2014/056389 dated Dec. 30, 2014, consists of 14 pages.
Notification Concerning Transmittal of International Preliminary Report on Patentability, PCT/US2014/056389 dated Apr. 28, 2016, consists of 11 pages.

*Primary Examiner* — Amr Awad
*Assistant Examiner* — Donna Lui
(74) *Attorney, Agent, or Firm* — Patterson + Sheridan, LLP

(57) ABSTRACT

Embodiments described herein include a method and apparatus for capacitive sensing in input devices integrated with a display device. In one embodiment, a processing system for a display device comprising an integrated capacitive sensing device is provided that includes a display driver module, a transmitter module, and a receiver module. The display driver and transmitter modules are configured to operate in a display update mode and a sleep mode. The receiver module is configured to, while operating in a doze mode, communicate with and trigger the transmitter module to enter the active sensing mode while the display driver module remains in the sleep mode when presence of an object is detected based on the resulting signals.

20 Claims, 10 Drawing Sheets

(56) References Cited

U.S. PATENT DOCUMENTS

| | | | |
|---|---|---|---|
| 2006/0278444 A1 | 12/2006 | Binstead | |
| 2008/0012835 A1 | 1/2008 | Rimon et al. | |
| 2009/0241072 A1 | 9/2009 | Chaudhri et al. | |
| 2009/0289908 A1* | 11/2009 | Chen | G06F 1/3203 345/173 |
| 2010/0162182 A1 | 6/2010 | Oh et al. | |
| 2010/0214254 A1 | 8/2010 | Tsai | |
| 2011/0080367 A1 | 4/2011 | Marchand et al. | |
| 2011/0162066 A1 | 6/2011 | Kim et al. | |
| 2011/0185208 A1* | 7/2011 | Iwamoto | G06F 1/3203 713/323 |
| 2011/0193809 A1* | 8/2011 | Walley et al. | 345/173 |
| 2011/0316797 A1 | 12/2011 | Johansson | |
| 2012/0249476 A1 | 10/2012 | Schwartz et al. | |
| 2013/0038570 A1 | 2/2013 | Seo et al. | |
| 2013/0082937 A1 | 4/2013 | Liu et al. | |
| 2013/0176275 A1* | 7/2013 | Weaver | G06F 3/044 345/174 |
| 2013/0215061 A1 | 8/2013 | Rydenhag et al. | |
| 2013/0229367 A1 | 9/2013 | Pinch | |
| 2013/0314349 A1* | 11/2013 | Chien | H03G 7/00 345/173 |
| 2014/0022185 A1* | 1/2014 | Ribeiro et al. | 345/173 |
| 2014/0043247 A1* | 2/2014 | Singh et al. | 345/173 |
| 2014/0210771 A1* | 7/2014 | Kim et al. | 345/174 |
| 2014/0362042 A1* | 12/2014 | Noguchi | G06F 3/0412 345/174 |
| 2015/0062059 A1* | 3/2015 | Ho | G06F 1/3262 345/174 |

\* cited by examiner

IN-CELL LOW POWER MODES

CROSS-REFERENCE TO RELATED APPLICATIONS

This applications claims benefit of U.S. Provisional Patent Application Ser. No. 61/891,843, filed Oct. 16, 2013, which is incorporated by reference in its entirety.

FIELD OF THE INVENTION

Embodiments of the present invention generally relate to a method and apparatus for capacitive sensing.

DESCRIPTION OF THE RELATED ART

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). One common type of proximity sensor device is a capacitive sensing device.

Capacitive sensing devices, when integrated with a display device such as a tablet, touch screen or smart phone, are generally dependant on the timing provided by a display driver. As a result, in periods of display inactivity touch functionality is constrained, resulting in inefficient management of power by the capacitive sensing device.

Thus, there is a need for an improved a method and apparatus for capacitive sensing in input devices integrated with a display device.

SUMMARY OF THE INVENTION

Embodiments described herein include a method and apparatus for capacitive sensing in input devices integrated with a display device. In various embodiments, independency of capacitive sensing from display driver timing enables better utilization of low power modes. In some embodiments, synchronization of sensing data collection to certain positions (i.e., a beginning) of a display frame reduces potential latency in entering/exiting low power modes, thereby providing better efficiency of power management of the input device.

Embodiments described herein include a capacitive sensing device integrated with a display device, a processing system and a method for operating a capacitive sensing device. In one embodiment, a processing system for a display device comprising an integrated capacitive sensing device is provided that includes a display driver module, a transmitter module, and a receiver module. The display driver module is configured to update a display of the display device while in a display update mode and configured not to update the display device while in a sleep mode. The transmitter module includes transmitter circuitry configured to, while in an active sensing mode, drive transmitter signals onto a first plurality of sensor electrodes of the capacitive sensing device for capacitive sensing. The receiver module is configured to receive resulting signals from a second plurality of sensor electrodes, the resulting signals comprising effects corresponding to the transmitter signals, the receiver module communicatively coupled to the display driver module and the transmitter module, the receiver module configured to, while operating in a doze mode, communicate with and trigger the transmitter module to enter the active sensing mode while the display driver module remains in the sleep mode when presence of an object is detected based on the resulting signals.

In another embodiment, a method for operating a display device comprising an integrated capacitive sensing device is provide. The method includes changing an output state of a receiver module from a first output state to a second output state in response to determining presence of an object from signals received from sensor electrodes by the receiver module operating in a first capacitive sensing mode, switching a transmitter module from a sleep mode to an active touch mode in response to the change in the output state of the receiver module, and driving transmitter signals from the transmitter module onto sensor electrodes of the capacitive sensing device for capacitive sensing while in the active touch mode.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
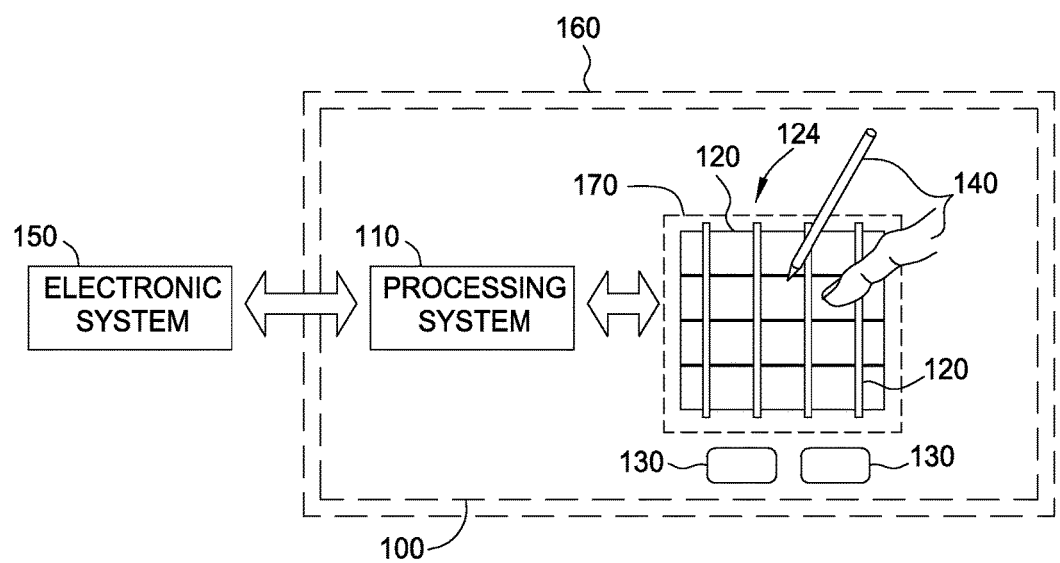
FIG. 1 is a schematic block diagram of an input device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously utilized the timing and interaction between a display driver module and a capacitive sensing module (i.e., transmitter module, receiver module) to provide improved functionality for low power modes. Idle low-power mode allows capacitive sensing modules for sensing touches and gestures with timing controlled by the capacitive sensing modules, thereby allowing the display driver module to be maintained in a low power (sleep) mode for longer durations when display updating is not needed, thereby reducing the overall power consumption of the input device. As result input device is able to sense touches and/or gestures in 2D mode while providing power savings needed for the low-power mode.

In various embodiments, while transmitter module is in a sleep mode, an analog front end utilized for transcapacitive sensing may be turned off while the receiver module is kept in an active state for absolute capacitive sensing. Further, the receiver module may be configured to use a first sensing technique when in a doze mode and a second sensing technique when in an active mode, thereby utilizing a sensing technique most appropriate for the power state of the input device.

FIG. 1 is a schematic block diagram of an input device 100 in accordance with embodiments of the present technology. In one embodiment, input device 100 comprises a display device comprising an integrated sensing device. Although the illustrated embodiments of the present disclosure are shown integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system 150. As appropriate, the input device 100 may communicate with parts of the electronic system 150 using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing elements 124 for detecting user input. The sensing elements 124 include a plurality of sensor electrodes 120. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 124 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 124 to create electric fields. In some capacitive implementations, separate sensing elements 124 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground), and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like.

In some embodiments, components composing the processing system 110 are located together, such as near sensing element(s) 124 of the input device 100. In other embodiments, components of processing system 110 are physically separate with one or more components close to sensing element(s) 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 124 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 124. As another example, the processing system 110 may perform filtering, demodulation or other signal conditioning. In various embodiments processing system 110 generates a capacitive image directly from the resulting signals received with sensing elements 124 (sensor electrodes 120). In other embodiments, processing system 110 spatially filters (e.g., taking a difference, weighted sum of neighboring elements) the resulting signals received with sensing elements 124 (or sensor electrodes 120) to generate a sharpened or averaged image. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of a display device 160. The display device 160 may be a tablet, touch screen, smart phone, a personal digital assistant, a cell phone, or other similar device. For example, the input device 100 may comprise substantially transparent sensing elements 124 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing (e.g., the active matrix control electrodes configured to control the source, gate and/or VCOM voltages). Shared components may include display electrodes, substrates, connectors and/or connections. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In one embodiment, the sensor electrodes 120 may be arranged on different sides of the same substrate. For example, each of the sensor electrode(s) 120 may extend longitudinally across one of the surfaces of the substrate. Further still, on one side of the substrate, the sensor electrodes 120 may extend in a first direction, but on the other side of the substrate, the sensor electrodes 120 may extend in a second direction that is either parallel with, or perpendicular to, the first direction. For example, the electrodes 120 may be shaped as bars or stripes where the electrodes 120 on one side of the substrate extend in a direction perpendicular to the sensor electrodes 120 on the opposite side of the substrate.

The sensor electrodes may be formed into any desired shape on the sides of the substrate. Moreover, the size and/or shape of the sensor electrodes 120 on one side of the substrate may be different than the size and/or size of the electrodes 120 on another side of the substrate. Additionally, the sensor electrodes 120 on the same side may have different shapes and sizes.

In another embodiment, the sensor electrodes 120 may be formed on different substrates that are then laminated together. In one example, a first plurality of the sensor electrodes 120 disposed on one of the substrate may be used to transmit a sensing signal (i.e., transmitter electrodes) while a second plurality of the sensor electrodes 120 disposed on the other substrate are used to receive resulting signals (i.e., receiver electrodes). In other embodiments, the first and/or second plurality of sensor electrodes may be driven as absolute capacitive sensor electrodes. In one embodiment, the first plurality of sensor electrodes may be larger (larger surface area) than the second plurality of sensor electrodes, although this is not a requirement. In other embodiments, the first plurality and second plurality of sensor electrodes may have a similar size and/or shape. Thus, the size and/or shape of the sensor electrodes 120 on one of the substrates may be different than the size and/or size of the electrodes 120 on the other substrate. Nonetheless, the sensor electrodes 120 may be formed into any desired shape on their respective substrates. Additionally, the sensor electrodes 120 on the same substrate may have different shapes and sizes.

In another embodiment, the sensor electrodes 120 are all located on the same side or surface of a common substrate. In one example, a first plurality of the sensor electrodes are comprised of jumpers in regions where the first plurality of sensor electrodes crossover the second plurality of sensor electrodes, where the jumpers are insulated from the second plurality of sensor electrodes. As above, the sensor electrodes 120 may each have the same size or shape or differing size and shapes.

In another embodiment, the sensor electrodes 120 are all located on the same side or surface of the common substrate and are isolated from each other in the sensing region 170. In such embodiments, the sensor electrodes 120 are electrically isolated from each other. In one embodiment, the electrodes 120 are disposed in a matrix array where each sensor electrode 120 is substantially the same size and/or shape. In such embodiment, the sensor electrodes 120 may be referred to as a matrix sensor electrode. In one embodiment, one or more of sensor electrodes of the matrix array of sensor electrodes 120 may vary in at least one of size and shape. Each sensor electrode of the matrix array may correspond to a pixel of the capacitive image. In one embodiment, the processing system 110 is configured to drive the sensor electrodes 120 with a modulated signal to determine changes in absolute capacitance. In another embodiment, processing system 110 is configured to drive a transmitter signal onto a first one of the sensor electrodes 120 and receive a resulting signal with a second one of the sensor electrodes 120. Further, one or more grid electrodes may be disposed on the common substrate, between the sensor electrodes 120 where the grid electrode(s) may be used to guard or shield the sensor electrodes. As used herein, shielding refers to driving a constant voltage onto an electrode and guarding refers to driving a varying voltage signal onto a second electrode that is substantially similar in amplitude and phase to the signal modulating first electrode in order to measure the capacitance of the first electrode. Floating an electrode can be interpreted as a form of guarding in cases where, by floating, the second electrode receives the desired guarding waveform via capacitive coupling from the first or third electrode in the input device 100. In various embodiments, guarding may be considered to be a subset of shielding such that guarding a sensor electrode would also shield that sensor electrode. The grid electrode may be driven with a varying voltage, a substantially constant voltage or electrically floated. The grid electrode may also be used as a transmitter electrode when it is driven with a transmitter electrode such that the capacitive coupling between the grid electrode and one or more sensor electrodes may be determined. In one various embodiments, a floating electrode may be disposed between the grid electrode and the sensor electrodes. In one particular embodiment, the floating electrode, the gird electrode and the sensor electrode comprise the entirety of a common electrode of a display device. In other embodiments, the grid electrode may be disposed on a separate substrate or surface of a substrate than the sensor electrodes 120 or both. Although the sensor electrodes 120 may be electrically isolated on the substrate, the electrodes may be coupled together outside of the sensing region 170—e.g., in a connection region that transmits or receives capacitive sensing signals on the sensor electrodes 120. In various embodiments, the sensor electrodes 120 may be disposed in an array using various patterns where the electrodes 120 are not all the same size and shape. Furthermore, the distance between the electrodes 120 in the array may not be equidistant.

In any of the sensor electrode arrangements discussed above, the sensor electrodes 120 and/or grid electrode(s) may be formed on a substrate that is external to the display device 160. For example, the electrodes 120 and/or grid electrode(s) may be disposed on the outer surface of a lens in the input device 100. In other embodiments, the sensor electrodes 120 and/or grid electrode(s) are disposed between the color filter glass of the display device and the lens of the input device. In other embodiments, at least a portion of the sensor electrodes and/or grid electrode(s) may be disposed such that they are between a Thin Film Transistor substrate (TFT substrate) and the color filter glass of the display device 160. In one embodiment, a first plurality of sensor electrodes and/or grid electrode(s) are disposed between the TFT substrate and color filter glass of the display device 160 and the second plurality of sensor electrodes and/or a second grid electrode(s) are disposed between the color filter glass and the lens of the input device 100. In yet other embodiments, all of sensor electrodes 120 and/or grid electrode(s) are disposed between the TFT substrate and color filter glass of the display device, where the sensor electrodes may be disposed on the same substrate or on different substrates as described above.

In one or more embodiment, at least a first plurality the sensor electrodes 120 comprised one or more display electrodes of the display device that are used in updating the display. For example, the sensor electrodes 120 may comprise the common electrodes such as one or more segments of a Vcom electrode, a source drive line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) Multi-domain Vertical Alignment (MVA), IPS and FFS), over an cathode layer (OLED), etc. In such embodiments, the common electrode can also be referred to as a "combination electrode", since it performs multiple functions. In various embodiments, each of the sensor electrodes 120 comprises one or more common electrodes associated with a pixel or sub pixel. In other embodiments, at least two sensor electrodes 120 may share at least one common electrode associated with a pixel or sub-pixel. While the first plurality sensor electrodes may comprise one or more common electrodes configured for display updating and capacitive sensing, the second plurality of sensor electrodes may be configured for capacitive sensing and not for display updating. Further, in one or more embodiments, the grid electrode and/or floating electrode, when present, comprise one or more common electrodes.

Alternatively, all of the sensor electrodes 120 may be disposed between the TFT substrate and the color filter glass of the display device 160. In one embodiment, a first plurality of sensor electrodes are disposed on the TFT substrate, each comprising one or more common electrodes and a second plurality of sensor electrodes may be disposed between the color filter glass and the TFT substrate. Specifically, the receiver electrodes may be part of a black mask on the color filter glass. In another embodiment, all of the sensor electrodes 120 comprise one or more common electrodes. The sensor electrodes 120 may be located entirely on the TFT substrate or the color filter glass as an array of electrodes. As discussed above, some of the sensor electrodes 120 may be coupled together in the array using jumper or all the electrodes 120 may be electrically isolated in the array and use grid electrodes to shield or guard the sensor electrodes 120. In one more embodiments, the grid electrode, when present, comprises one or more common electrodes.

In any of the sensor electrode arrangements described above, the sensor electrodes 120 may be operated in the input device 100 in the transcapacitive sensing mode by dividing the sensor electrodes 120 into transmitter and receiver electrodes or in the absolute capacitive sensing mode, or some mixture of both.

Figure 2:
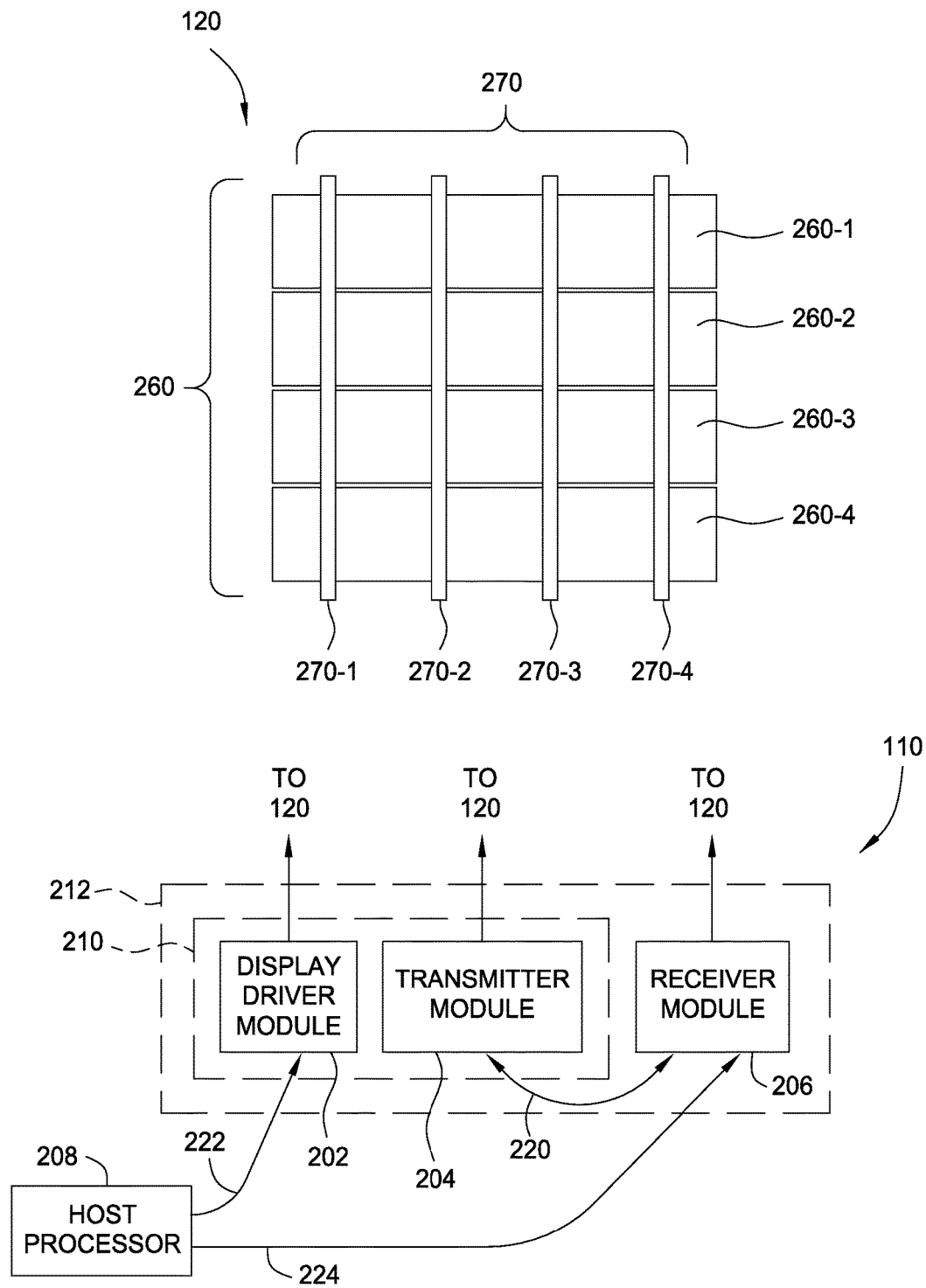
FIG. 2 is a simplified exemplary array of sensor elements coupled to a processing system of the input device of FIG. 1.

FIG. 2 is a simplified exemplary array of sensor elements 124 coupled to the processing system 110 of the input device 100 of FIG. 1 illustrating a exemplary pattern for the sensor electrodes 120 that may be used to sense the positional information of an input object 140 within the sensing region 170. For clarity of illustration and description, FIG. 2 illustrates the pattern of the sensor electrodes 120 as bars arranged in columns and rows, and does not show all of the interconnecting features and/or other related components. While FIG. 2 illustrates the sensor electrode pattern as a pattern of simple columns and rows, this is not meant to be limiting and in other embodiments, various numbers, orientations and shapes for the sensor electrodes 120 comprising an array of sensing elements 124 may be utilized.

The pattern of sensor electrodes 120 may be comprised of a plurality of transmitter electrodes 260 and a plurality of receiver electrodes 270. The transmitter electrodes 260 may be used to update parts of a display and for capacitive sensing, and thus are referred to herein as "common electrodes," and the receiver electrodes 270 are configured to receive the resulting capacitive sensing signal(s) delivered through the common electrode(s), and thus are referred to herein as "receiver electrodes." circuitry to sense (or not to sense), and/or the like.

In some embodiments, transmitter electrodes 260 and receiver electrodes 270 may be similar in size and/or shape. In one example, as shown, the pattern of sensor electrodes 120 may comprises a first plurality of transmitter electrodes 260 (e.g., transmitter electrodes 260-1, 260-2, 260-3, 260-4 etc.) and a second plurality of receiver electrodes 270 (e.g., receiver electrodes 270-1, 270-2, 270-3 . . . 270-4), which may disposed above, below, or on the same layer as the first plurality of transmitter electrodes 260. One will note that the pattern of sensor electrodes 120 illustrated in FIG. 2 may alternatively utilize various sensing techniques, such as mutual capacitive sensing, absolute capacitive sensing, elastive, resistive, inductive, magnetic acoustic, ultrasonic, or other useful sensing techniques, without deviating from the scope of the invention described herein.

Transmitter electrodes 260 and receiver electrodes 270 are typically ohmically isolated from each other. That is, one or more insulators separate transmitter electrodes 260 and receiver electrodes 270 and prevent them from electrically shorting to each other in regions where they may overlap. In some embodiments, transmitter electrodes 260 and receiver electrodes 270 are separated by electrically insulative material disposed between them at cross-over areas. In such configurations, the transmitter electrodes 260 and/or receiver electrodes 270 may be formed with jumpers connecting different portions of the same electrode. In some embodiments, transmitter electrodes 260 and receiver electrodes 270 are separated by one or more layers of electrically insulative material. In some other embodiments, transmitter electrodes 260 and receiver electrodes 270 are separated by one or more substrates, for example, they may be disposed on opposite sides of the same substrate, or on different substrates that are laminated together. In the embodiment shown in FIG. 2, the transmitter electrodes 260 have greater surface area than the receiver electrodes 270. In other some embodiments, transmitter electrodes 260 and receiver electrodes 270 may be similar in size and shape. In various embodiments, as will be discussed in more detail later, transmitter electrodes 260 and receiver electrodes 270 may be disposed on a single layer of a substrate. In yet other embodiments, other electrodes (not shown in FIG. 2), including but not limited to, a shield electrode(s) may be disposed proximate to either transmitter electrodes 260 or receiver electrodes 270. The shield electrode may be configured to shield the transmitter electrodes 260 and/or receiver electrodes 270 from interference such as nearby sources of driven voltages and/or currents. In some embodiments, the shield electrode(s) may be disposed with transmitter electrodes 260 and receiver electrodes 270 on a common side of a substrate. In other embodiments, the shield electrode(s) may be disposed with transmitter electrodes 260 on a common side of a substrate. In other embodiments, the shield electrode(s) may be disposed with receiver electrodes 270 on a common side of a substrate. In yet other embodiments, the shield electrode may be disposed on a first side of a substrate while transmitter electrodes 260 and/or receiver electrodes 270 are disposed on a second side, opposite the first.

In one embodiment, the areas of localized capacitive coupling between transmitter electrodes 260 and receiver electrodes 270 may be termed "capacitive pixels." The capacitive coupling between the transmitter electrodes 260 and receiver electrodes 270 change with the proximity and motion of input objects in the sensing region associated with the transmitter electrodes 260 and receiver electrodes 270.

In some embodiments, the pattern of sensor electrodes 120 is "scanned" to determine these capacitive couplings. That is, the transmitter electrodes 260 are driven to transmit transmitter signals. In other embodiments, as described herein, the pattern of sensor electrodes 120 may be "non-sequentially" scanned to determine capacitive couplings, such any order of transmitter electrodes 260 (i.e., not just adjacent transmitter electrodes in a sequential order) may be driven to transmit transmitter signals.

The input device 100 may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined. The receiver electrodes 270 may be operated singly or multiply to acquire resulting signals (i.e., received capacitive sensing signals). The resulting signals may be used to determine measurements of the capacitive couplings at the capacitive pixels, which are used to determine whether an input object is present and its positional information, as discussed above. A set of values for the capacitive pixels form a "capacitive image" (also "capacitive frame" or "sensing image") representative of the capacitive couplings at the pixels. Multiple capacitive images may be acquired over multiple time periods, and differences between them used to derive information about input object(s) in the sensing region. For example, successive capacitive images acquired over successive periods of time can be used to track the motion(s) of one or more input objects entering, exiting, and within the sensing region. In various embodiments, the sensing image, or capacitive image, comprises data received during a process of measuring the resulting signals received with at least a portion of the sensing elements 124 distributed across the sensing region 170. The resulting signals may be received at one instant in time, or by scanning the rows and/or columns of sensing elements distributed across the sensing region 170 in a raster scanning pattern (e.g., serially poling each sensing element separately in a desired scanning pattern), row-by-row scanning pattern, column-by-column scanning pattern or other useful scanning technique. In many embodiments, the rate that the "sensing image" is acquired by the input device 100, or sensing frame rate, is between about 60 and about 180 Hertz (Hz), but can be higher or lower depending on the desired application.

In some touch screen embodiments, the transmitter electrodes 260 and/or the receiver electrodes 270 are disposed on a substrate of the associated display device 160. For example, the transmitter electrodes 260 and/or the receiver electrodes 270 may be disposed on a polarizer, a color filter substrate, or a glass sheet of an LCD. In one embodiment, the transmitter electrodes 260 may be disposed within a display element of the display device comprised of at least a polarizer, a color filter substrate, and a glass sheet of an LCD. As a specific example, the transmitter electrodes 260 may be disposed on a TFT (Thin Film Transistor) substrate of an LCD, and may or may not also be used in display operations of the display device. As another example, the receiver electrodes 270 may be disposed on a color filter substrate, on an LCD glass sheet, on a protection material disposed over the LCD glass sheet, on a lens glass (or window), and the like. In those embodiments, where transmitter electrodes 260 and/or receiver electrodes 270 are disposed on a substrate within the display device (e.g., color filter glass, TFT glass, etc.), the sensor electrodes may be comprised of a substantially transparent material (e.g., ITO, ATO) or they may be comprised of an opaque material and aligned with the pixels of the display device (e.g., disposed such that they overlap with the "black mask" between pixel dots or a subpixel of the pixel).

In some touch screen embodiments, as shown in FIG. 2, transmitter electrodes comprise one or more common electrodes (e.g., segments of a segmented "V-com electrode"), hereafter referred to as "common electrodes," used in updating the display of the display screen. While the transmitter electrodes, or common electrodes, can be used to perform other capacitive sensing techniques, as discussed above, for clarity and simplicity of the discussion a common electrode capacitive sensing configuration is primarily used in the discussion below. These common electrodes may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode," since it performs multiple functions. In various embodiments, each transmitter electrode comprises one or more common electrodes. In other embodiments, at least two transmitter electrodes may share at least one common electrode.

In various embodiments, the processing system 110 drives the common electrodes for display updating and capacitive sensing in the same time period, or in different time periods. For example, the common electrodes may transmit signals for display updating during a display-update time of a row update cycle, and transmit signals for capacitive sensing during a non-display time of the row update cycle (e.g., sometimes called "horizontal blanking time"). In another example, processing system 110 drives the common electrodes for display updating during a display-update time of a row update cycle, and for capacitive sensing during a sensing period between two display row update periods of a display frame, where the display period may be at least as long as a display row update period (e.g., sometimes called "long horizontal blanking time" or "in-frame blanking time" or "distributed vertical blanking time"). In one embodiment, the sensing period is a multiple combined non-display times of the row update cycles. As another example, processing system 110 drives the common electrodes for display updating during row update cycles with actual display row updates, and for capacitive sensing during extra "row update cycles" without actual display row updates (e.g., the non-display times between updating sections of frames or entire frames, sometimes called "vertical blanking time"). Further, in various embodiments, the processing system 110 drives the common electrodes for capacitive sensing during any combination of the above non-display times. In another embodiment, the processing system 110 drives the common electrodes simultaneously for display updating and capacitive sensing, but separate them spatially. For example, a first common electrode corresponding to a first display row may be driven for display updating and a second common electrode corresponding to a second display row may be driven for input sensing such that they at least partially overlap in time. In yet a further example, the common electrodes may use the same transmission for both display updating and capacitive sensing.

In one embodiment, processing system 110 of input device 100 comprises an display driver module 202, a transmitter module 204 and a receiver module 206. The receiver module 206 include receiver circuitry that is coupled to the receiver electrodes 270 so that the receiver module 206 is able to provide a signal to the receiver electrodes 270 so that the receiver module 206 is able to receive the resulting signals from the receiver electrodes 270 when the input device 100 is operating in a first type of capacitive sensing, for example, absolute sensing. The receiver module 206 may also be utilized to receive the resulting signals from the receiver electrodes 270 when the input device 100 is operating in a second type of capacitive sensing, for example, transcapacitive sensing. In various embodiments, receiver module 206 is used to acquire sensor data (e.g., receive resulting signals). The receiver module 206 may be further configured to perform various calculations to help determine the positional information of an input object. While not shown, processing system 110 may further comprise a determination module configured to determine positional information for an input object in a sensing region of the display device based on the resulting signals. The display driver module 202 includes driver circuitry is coupled with common electrodes, and comprises driver circuitry configured for displaying images on the display screen, i.e., update the display screen. The driver circuitry is configured to apply one or more pixel voltage(s) to the display pixel electrodes through pixel source drivers (not shown). The driver circuitry is also configured to apply one or more common drive voltage(s) to the common electrodes, and operate them as common electrodes of the display screen. The transmitter module 204 is configured to operate the common electrodes as transmitter electrodes 260 when the input device 100 is operating in the second type of capacitive sensing, i.e., transcapacitive sensing.

While the processing system 110 illustrated in FIG. 2 comprises three modules, the processing system 110 may be implemented with more or less modules to control the various components in the input device. For example, the functions of the display driver module 202 and the transmitter module 204 may be implemented in a single integrated circuit (shown in phantom as an integrated circuit (IC) 210) that can control the display module elements (e.g., common electrodes) and drive transmitter signals with the transmitter electrodes 260. In another example, the functions of the display driver module 202, the transmitter module 204 and the receiver module 206 may be implemented in a single integrated circuit (shown in phantom as IC 212) that can control the display module elements (e.g., common electrodes) and drive transmitter signals and/or receiver resulting signals transmitted with and/or received from the sensor electrodes 120, which may comprise the receiver electrodes 270 and transmitter electrodes 260. In yet another example, a first portion of the functions of the display driver module 202, and the receiver module 206 may be implemented in a first integrated circuit that control the driving at least a portion of the display electrodes (e.g., source line electrodes) and receiver module that can control resulting signals received from the sensor electrodes 120, which may comprise the receiver electrodes 270 and transmitter electrodes 260 and a second portion of the display driver module 202 that control driving another portion of the display electrodes (gate electrodes and/or common electrodes) and the functions of transmitter module 204 may be implemented in a second integrated controller. In some configurations, the processing system 110 may comprise display driver module 202, a transmitter module 204, and a receiver module 206 that are disposed within one or any number of ICs found in the processing system 110, depending to the desired processing architecture. In cases where there are more than one modules or ICs, synchronization between modules (e.g., receiver module 206 and display driver module 202) may be achieved by communicating between these systems using a synchronization mechanism. In one embodiment, the synchronization mechanism comprises a synchronization protocol that controls a number of functionality provided by the processing system 110, such as controlling oscillator frequency, transmitter signal pulses, and glass-specific features (e.g., enable/disable gate lines). In one example, the synchronization mechanism may synchronize display updating cycle and capacitive sensing cycle by providing a synchronized clock, information about display driving state, information about the capacitive sensing state, direction to display update circuitry to update (or not to update), direction to capacitive sensing circuitry to sense (or not to sense), and/or the like. In one embodiment, the process of synchronizing the components that are controlling the selection of common electrodes and the components that are controlling the creation of the sensing images may include sending periodic communications between these various components, such as control signals.

As discussed above, the input device 100 may be configured to provide input to the electronic system 150, and as such, the processing system 110 of the input device 100 may be configured to communicate with parts of the electronic system 150, for example, a host processor 208 of the electronic system 150, in order to control and coordinate display and input sensing activities. In the embodiment depicted in FIG. 2, the host processor 208 of the electronic system 150 communicates to the display driver module 202 of the input device 100 through a communication path 222. The host processor 208 also communicates to the receiver module 206 of the input device 100 through a communication path 224. The communication paths 222, 224 may be wired or wireless as described above. The communication between the host processor 208 and the display and receiver modules 202, 206 may be bi-directional.

The receiver module 206 is also configured to communicate with the transmitter module 204. In one embodiment, the receiver module 206 includes an output pin (not shown) which is coupled to an input pin of the transmitter module 204 by a connection 220. The connection 220 may be in the form of a conductive trace formed on the substrate or flex tail on which the transmitter and receiver modules 204, 206 are mounted. In embodiments wherein the transmitter and receiver modules 204, 206 are in a single IC, the connection 220 may be in the form of conductive routing within the same IC. The receiver module 206 may change the state of the output to the output pin, for example, by changing an output voltage or other electrical characteristic of the output pin. The output voltage is generally indicative of the state of the receiver module 206, and thus, may be utilized by the transmitter module 204 to determine the state of the receiver module 206 without utilizing other communication channels or routing information through another processor, such as the host processor 208. For example, the output voltage is driven low by the receiver module 206 when the receiver module 206 is operating in the first type of capacitive sensing, while the output voltage is driven high by the receiver module 206 when the receiver module 206 is operating in the second type of capacitive sensing.

Figure 3:
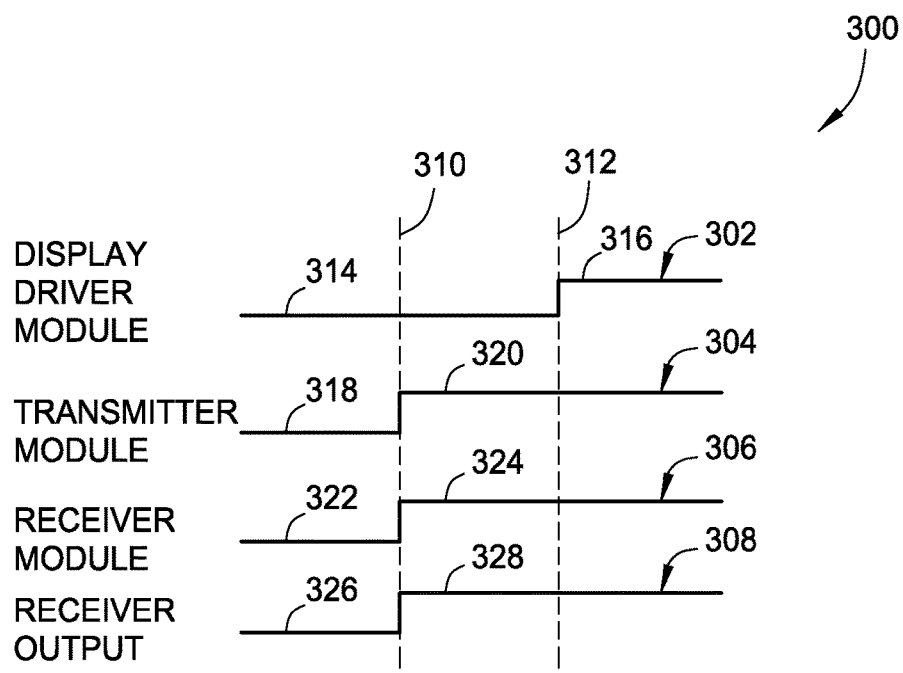
FIG. 3 is a diagram illustrating states of a display driver module, a transmitter module and a receiver module of a processing system through a sequence of events.

FIG. 3 is a diagram 300 illustrating states 302, 304, 306 of a display driver module 202, a transmitter module 204 and a receiver module 206 of the processing system 110 through a sequence of events. Time is on the x-axis of the diagram 300, while the states 302, 304, 306 of each module 202, 204, 206 are indicated on the y-axis. A state 308 of the receiver output (i.e., output voltage of the output pin of the receiver module 206 coupled to the transmitter module 204 by the connection 220) is also shown in the diagram 300 of FIG. 3.

Initially, the state 302 of the display driver module 202 is in a first display driving state 314, the state 304 of the transmitter module 204 is in a first transmitting state 318 and the state 306 of the receiver module 206 is in a first receiving state 322. In the first display driving state 314, the display driver module 202 is in a sleep mode. That is, the display driver module 202 is not updating images of the display device 160 during the first display driving state 314. In the first transmitting state 318, the transmitter module 204 also is in a sleep mode. That is, the transmitter module 204 is not driving signals with the transmitter electrodes 260 during the first transmitting state 318. In the first receiving state 322, the receiver module 206 is in a doze mode. In the doze mode, the receiver module 206 is driving modulated signals and receiving resulting signals with the receiver electrodes 270 during the first receiving state 322 to perform the first type of sensing, e.g., absolute capacitive sensing. While in the doze mode, the state 308 of the receiver output of the receiver module 206 is driven to a low voltage state 326.

While the receiver module 206 is in the first receiving state 322, a first event 310 may occur which is the detection of the presence of an input object 140 in the sensing region 170 utilizing an absolute capacitive sensing technique. In response to the first event 310, the state 306 of the receiver module 206 changes to a second receiving state 324. With the state 306 of the receiver module 206 changing from the first receiving state 322 to the second receiving state 324, the output state 308 of the receiver module 206 changes from the low voltage state 326 and is driven to a high voltage state 328.

The transmitter module 204, through the connection 220, senses the change in the state 308 of the output of the receiver module 206. In response to the state 308 of the output of receiver module 206 changing from the low voltage state 326 to the high voltage state 328, the state 304 of the transmitter module 204 also changes at the first event 310 from the first transmitting state 318 to a second transmitting state 320. In the second transmitting state 320, the transmitter module 204 drives a transmitter sensing signal with the transmitter electrodes 260. Because the receiver module 206 is in the second receiving state 324, resultant signals comprising effects of the modulated sensing signal driven on the transmitter electrodes 260 can be received by the receiver module 206 utilizing the receiver electrodes 270 and utilized to perform the first type of capacitive sensing, i.e., transcapacitive sensing. During this time, the display driver module 202 remains in the first display driving state 314, thereby conserving input device power.

While in receiver module 206 is in the second receiving state 324, the first type of capacitive sensing, i.e., transcapacitive sensing, is utilized to determine an occurrence of a second event 312. That is, the first type of capacitive sensing is utilized to determine the presence of an input object 140 in the sensing region 170. Alternatively, while the receiver module 206 is in the second receiving state 324, the first type of capacitive sensing is utilized to determine if input present in the sensing region 170 meets a predefined criteria, such as a gesture, wake-up gesture, un-lock gesture or other predefined input code, for example, a series of taps. An example of an un-lock gesture as predefined input code configured as a series of taps is described further below with reference to FIGS. 11A-11F. The predefined input code may also include, but is not limited to, any one or more of the location of the taps, the timing between taps, movement of the taps, and the size or shape of the input object performing the gesture, among others.

In one embodiment, an absolute location of tap and/or a relative location of one tap to another tap may be defined by the predefined input code. For example, if the touches (i.e., taps) are within a predefined proximity of each other or meet some other predefined pattern, such as making a shape such as triangle, square, etc, the predefined input code will be satisfied and unlocked the input device 100.

In another embodiment, the timing between taps may be defined by the predefined input code. For example, a time difference between an occurrence of a landing event of a tap and a lift off event of the tap may be determined and check to see if the time difference falls within a time range set by the predefined input code. In another example, a time difference between an occurrence of a landing event of a first tap and a landing event of a second tap may be determined and checked to see if the time difference falls within a time range set by the predefined input code. In another example, a time difference between an occurrence of a lift off event of a first tap and a landing event of a second tap may be determined and checked to see if the time difference falls within a time range set by the predefined input code. Meeting the predefined input code may require meeting two or other combination of the examples provided above.

In another embodiment, the predefined input code may include a limit to the range of "movement" allowed by an input object interfacing with the input device. For example, predefined input code may be met if the input object is determined to have moved a distance across the sensing region that is within a predefined range.

In another embodiment, the predefined input code may be met when a gesture is made by an input object for which one or both of a size and shape of this input object meets a predefined criteria. For example, if a detected size and/or shape of an input object is outside of a predetermined range, the predefined input code would not be satisfied and the input device would not unlock. Additionally, if more than one input object was detected, the gesture may be rejected. Alternatively, the predefined input code may require more than one object be detected in the sensing region in order for the predefined input code to be satisfied.

Upon determination that the second event 312 has occurred, the receiver module 206 communicates with display driver module 202 to indicate that the second event 312 has occurred. The receiver module 206 may communicate directly with display driver module 202, or alternatively, the receiver module 206 may communicate with the host processor 208 or other logic device, which in turn communicates with display driver module 202. Upon receiving information or a signal indicative that the second event 312 has occurred, the state 302 of the display driver module 202 transitions to a second display driving state 316. In the second display driving state 316, the display driver module 202 updates the display frame so that images may be updated on the display device 160.

After the second event 312, the transmitter module 204 remains in the second transmitting state 320, the receiver module 206 remains in the second receiving state 324, while the state 308 of the output of the receiver module 206 remains driven to a high voltage state 328. Thus, after the second event 312, the images of display device 160 are updated while the input device 100 operates in the first type of capacitive sensing as described above, for example by using blanking periods of non-display update time to interleave periods of sensing between display update periods.

Figure 4:
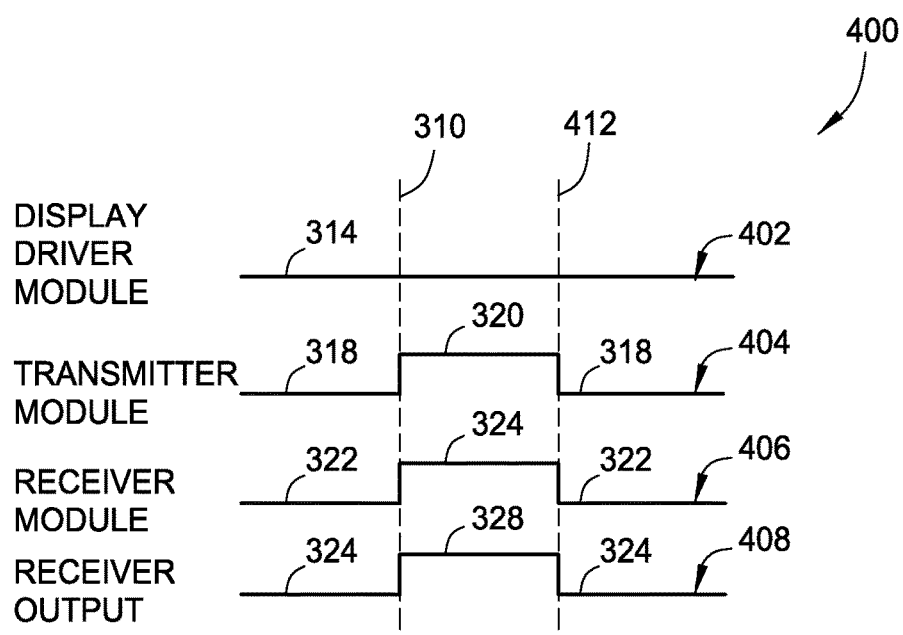
FIG. 4 is a diagram illustrating states of a display driver module, a transmitter module and a receiver module of a processing system through another sequence of events.

FIG. 4 is a diagram 400 illustrating states 402, 404, 406 of a display driver module 202, a transmitter module 204 and a receiver module 206 of the processing system 110 through a sequence of events similar to that described with reference to FIG. 3, except wherein that the criteria for defining that the second event 312 is not met, thus enabling a second event 412 to occur. That is, the period in which the input device 100 waits for the second event 312 to occur expires or times out at the second event 412. Time is on the x-axis of the diagram 400, while the states 402, 404, 406 of each module 202, 204, 206 is indicated on the y-axis. A state 408 of the receiver output (i.e., output voltage of the output pin of the receiver module 206 coupled to the transmitter module 204 by the connection 220) is also shown in the diagram 400 of FIG. 4.

The sequence of events depicted in diagram 400 is identical of that for the sequence of events depicted in diagram 400 up to the second event 412. The second event 412 occurs when the second event 312 does not occur within a predetermined period of time. Upon determination that the second event 412 has occurred, the state 402 of the display driver module 202 remains in the first display driving state 314. Thus, power is saved by not updating the display device 160 when no input has been detected to unlocked or turn on the display device 160. In response to the second event 412, the receiver module 206 changes back to the first receiving state 322, while the state 408 of the output of the receiver module 206 is driven from the high voltage state 328 to the low voltage state 326.

The transmitter module 204, in response to the output of the receiver module 206 being driven to the low voltage state 326, transition back to the first transmitting state 318. At this point in time, the display driver module 202 and transmitter module 204 remains in a sleep mode (e.g., the first states 314, 318) thus conserving energy until a first event 310 triggers the input device 100 to return to an active state and perform a second type of capacitive sensing.

Figure 5:
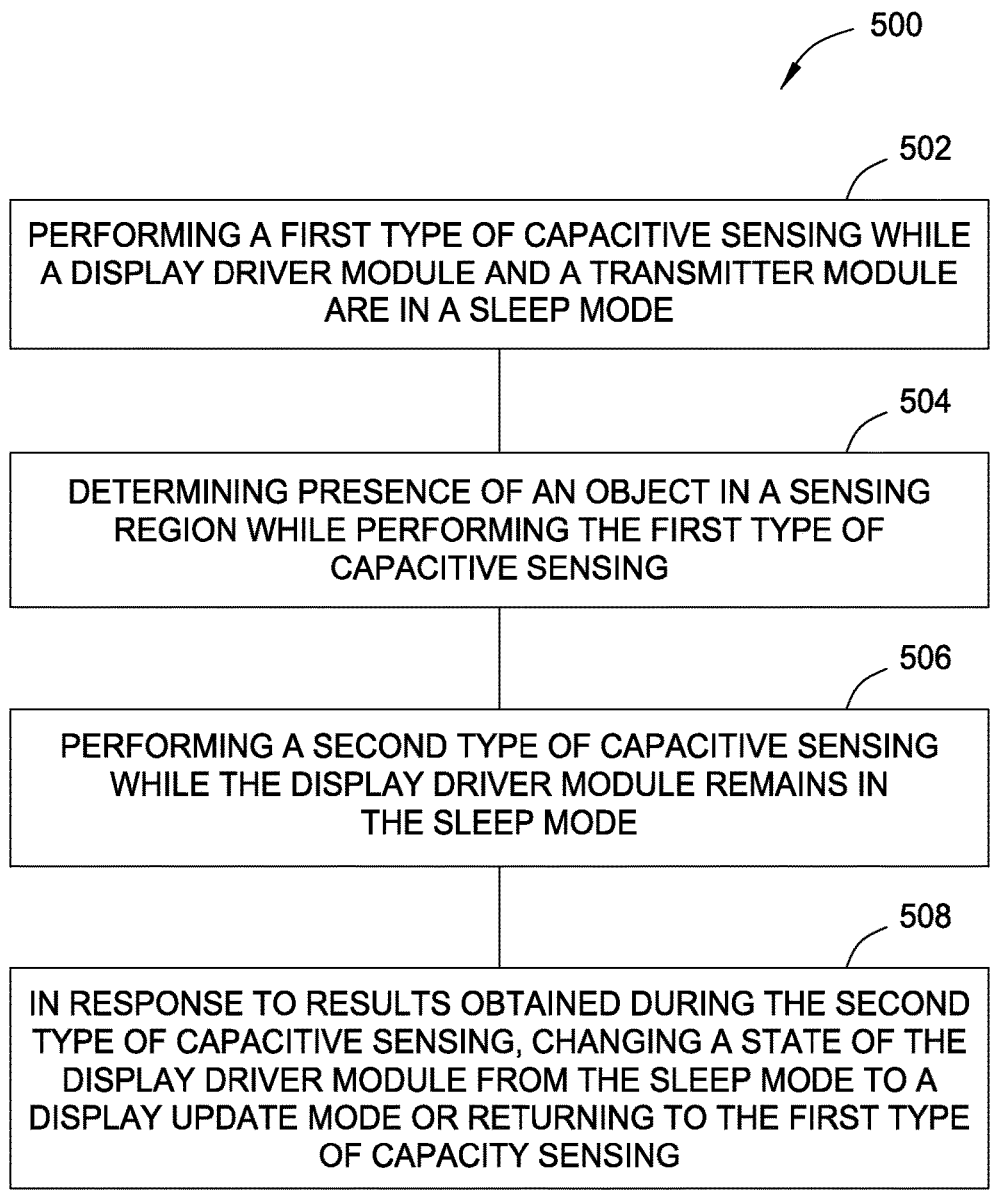
FIG. 5 is a flow diagram of one embodiment of a method for controlling power to modules of a processing system.

FIG. 5 is a flow diagram of one embodiment of a method 500 for controlling power to modules 202, 204, 206 of a processing system 110. The method 500 begins at step 502 by performing one type of capacitive sensing while the display driver module and the transmitter module are in a sleep mode. For example, absolute capacitive sensing may be performed using the receiver module while the display driver module and the transmitter module are in the sleep mode. While the display driver module and the transmitter module are in the sleep mode, presence of an object in a sensing region may be detected by performing the first type of capacitive sensing at step 504.

At step 506, a second type of capacitive sensing is performed while the display driver module remains in the sleep mode. For example, the input device may switch from the first type of capacitive sensing to the second type of capacitive sensing in response to detection of a presence of an object in the sensing region of the input device at step 504. The second type of capacitive sensing may be performed utilizing the transmitter module and receiver module to perform a transcapacitive sensing routine.

At step 508, in response to results obtained during the second type of capacitive sensing, a state of the display driver module is changed from the sleep mode to a display update mode, or the state of the input device is returned to the first type of capacity sensing. For example, if results obtained during the second type of capacitive sensing meet a predefined criteria, such as a gesture or code, the display driver module begins updating images of the display device by entering a display update mode from the sleep mode. Conversely, if results obtained during the second type of capacitive sensing fail to meet a predefined criteria within a predefined time period, the display driver module stays in the sleep mode while the input device return to the first type of capacity sensing. At this point, the method 500 may repeat.

Figure 6:
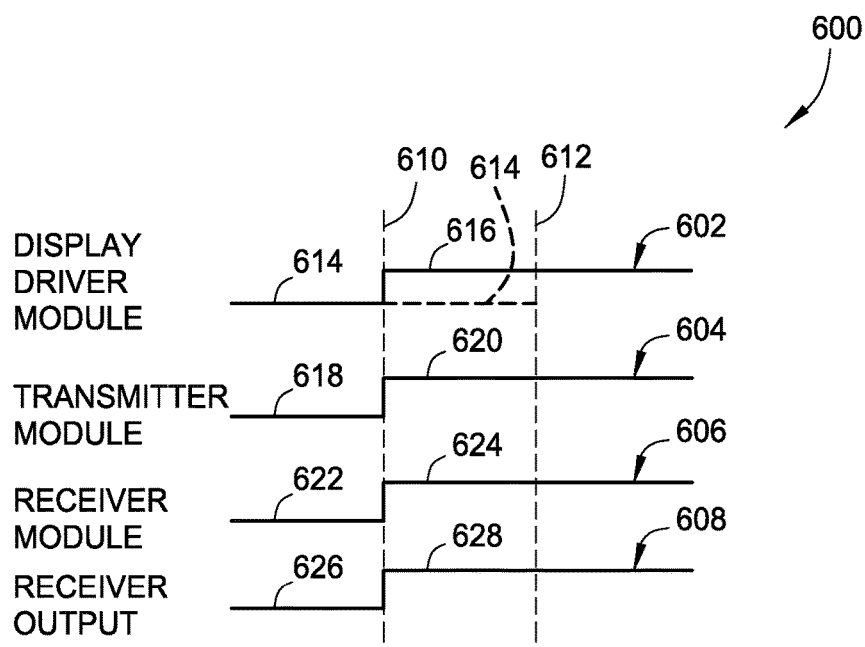
FIG. 6 is a diagram illustrating states of a display driver module, a transmitter module and a receiver module of a processing system through a sequence of events.

FIG. 6 is a diagram 600 illustrating states 602, 604, 606 of a display driver module 202, a transmitter module 204 and a receiver module 206 of the processing system 110 through another sequence of events. Time is on the x-axis of the diagram 600, while the states 602, 604, 606 of each module 202, 204, 206 is indicated on the y-axis. A state 608 of the receiver output (i.e., output voltage of the output pin of the receiver module 206 coupled to the transmitter module 204 by the connection 220) is also shown in the diagram 600 of FIG. 6.

Initially, the state 602 of the display driver module 202 is in a first display driving state 614, the state 604 of the transmitter module 204 is in a first transmitting state 618 and the state 606 of the receiver module 206 is in a first receiving state 622. In the first display driving state 614, the display driver module 202 is in a sleep mode. That is, the display driver module 202 is not updating images of the display device 160 during the first display driving state 614. In the first transmitting state 618, the transmitter module 204 also is in a sleep mode. That is, the transmitter module 204 is not driving signals with the transmitter electrodes 260 during the first transmitting state 618. In the first receiving state 622, the receiver module 206 is in a doze mode. In the doze mode, the receiver module 206 is driving modulated signals and receiving resulting signals with the receiver electrodes 270 during the first receiving state 622 to perform the first type of sensing, e.g., absolute capacitive sensing. While in the doze mode, the state 608 of the receiver output of the receiver module 206 is driven to a low voltage state 626.

While the receiver module 206 is in the first receiving state 622, a first event 610 may occur which may be in the form of an instruction from the host processor 208 for the display driver module 202 and transmitter module 204 of the input object 140 to awaken from a sleep mode and enter an active mode. The instruction from the host processor 208 is provided at least to the receiver module 206, and optionally also to the display driver module 202. In response to the first event 610, the state 606 of the receiver module 206 changes to a second receiving state 624. With the state 606 of the receiver module 206 changing from the first receiving state 622 to the second receiving state 624, the output state 608 of the receiver module 206 changes from being driven to the low voltage state 626 to being driven to a high voltage state 628.

As discussed above, the transmitter module 204 senses the change in the state 608 of the output of the receiver module 206 through the connection 220. In response to the state 608 of the output of receiver module 206 changing from the low voltage state 626 to the high voltage state 628, the state 604 of the transmitter module 204 also changes at the first event 610 from the first transmitting state 618 to a second transmitting state 620. In the second transmitting state 620, the transmitter module 204 drives a modulated sensing signal with the transmitter electrodes 260. Because the receiver module 206 is in the second receiving state 624, resultant signals comprising effects of the modulated sensing signal driven on the transmitter electrodes 260 can be received by the receiver module 206 utilizing the receiver electrodes 270 and utilized to perform the second type of capacitive sensing, i.e., transcapacitive sensing.

In the embodiment depicted in FIG. 6, the state 602 of the display driver module 202 changes from the first display driving state 614 (i.e., the sleep mode) to the second display driving state 616 (i.e., the active display update mode) in response to the instruction from the host processor 208. Optionally, the display driver module 202 may remain in the first display driving state 614 when the receiver module 206 receives the instructions from the host processor 208, thereby conserving input device power.

While in receiver module 206 is in the second receiving state 624, the second type of capacitive sensing, i.e., transcapacitive sensing, is utilized to determine an occurrence of a second event 612. That is, the first type of capacitive sensing is utilized to determine the presence of an input object 140 in the sensing region 170. Alternatively, while in receiver module 206 is in the second receiving state 624, the first type of capacitive sensing is utilized to determine if input in the sensing region 170 meets a predefined criteria, such as a gesture or other predefined input code, for example, a series of taps.

Upon determination that the second event 612 has occurred, the state 602 of the display driver module 202 remains in the second display driving state 616, or if not already in the second display driving state 616, the display driver module 202 remains in the second display driving state 616. In the second display driving state 616, the display driver module 202 updates the display frame so that images may be updated on the display device 160. After the second event 612, the transmitter module 204 remains in the second transmitting state 620, the receiver module 206 remains in the second receiving state 624, while the state 608 of the output of the receiver module 206 remains driven to a high voltage state 628. Thus, after the second event 612, the images of display device 160 are updated while the input device 100 operates in the second type of capacitive sensing as described above.

Figure 7:
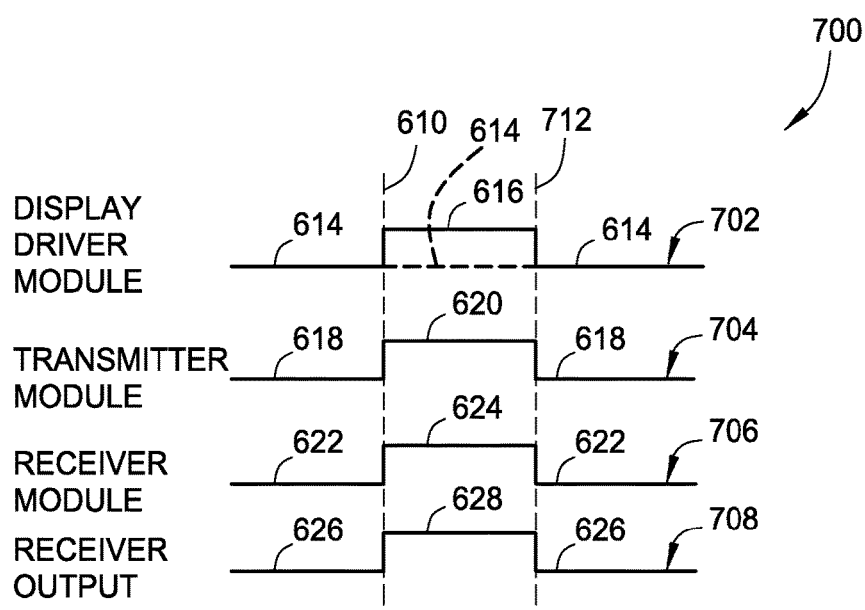
FIG. 7 is a diagram illustrating states of a display driver module, a transmitter module and a receiver module of a processing system through another sequence of events.

FIG. 7 is a diagram 700 illustrating states 702, 704, 706 of a display driver module 202, a transmitter module 204 and a receiver module 206 of the processing system 110 through a sequence of events similar to that described with reference to FIG. 6, except wherein that the criteria for defining that the second event 612 is not met, thus enabling a second event 712 to occur. That is, the period in which the input device 100 wait for the second event 612 to occur expires or times out at the second event 712. Time is on the x-axis of the diagram 700, while the states 702, 704, 706 of each module 202, 204, 206 is indicated on the y-axis. A state 708 of the receiver output (i.e., output voltage of the output pin of the receiver module 206 coupled to the transmitter module 204 by the connection 220) is also shown in the diagram 700 of FIG. 7.

The sequence of events depicted in diagram 700 is identical of that for the sequence of events depicted in diagram 600 up to the second event 712. The second event 712 occurs when the second event 612 does not occur within a predetermined period of time. Upon determination that the second event 712 has occurred, the state 702 of the display driver module 202 returns to the first display driving state 614, or remains in the first display driving state 614 if in that state prior to the second event 712. Thus, power is saved by not updating the display device 160 when no input has been detected to unlocked or turn on the display device 160. In response to the second event 712, the receiver module 206 changes back to the first receiving state 622, while the state 708 of the output of the receiver module 206 is driven from the high voltage state 628 to the low voltage state 626.

The transmitter module 204, in response to the output of the receiver module 206 being driven to the low voltage state 626, transition back to the first transmitting state 618. At this point in time, the display driver module 202 and transmitter module 204 remains in a sleep mode (e.g., the first states 614, 618) thus conserving energy until a first event 610 triggers the input device 100 to return to an active state and perform a second type of capacitive sensing.

Figure 8:
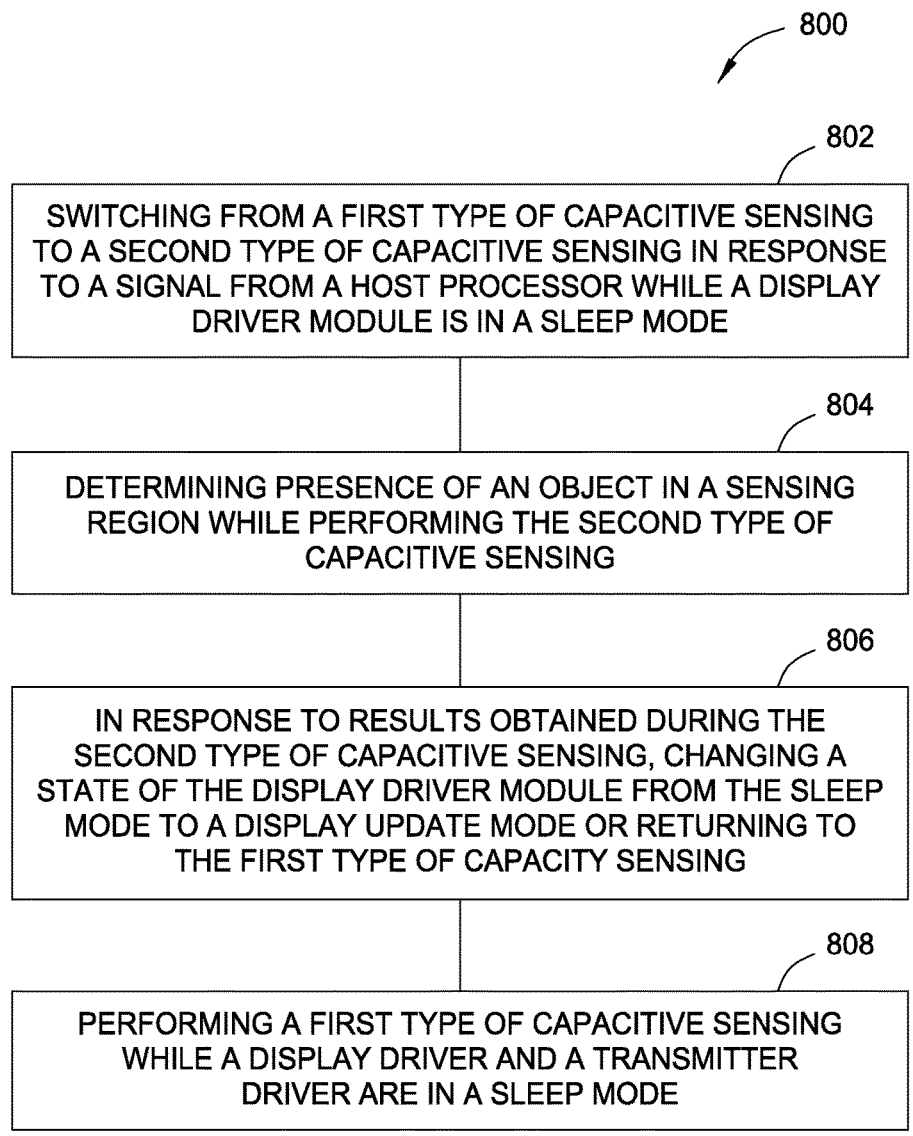
FIG. 8 is a flow diagram of another embodiment of a method for controlling power to modules of a processing system.

FIG. 8 is a flow diagram of one embodiment of a method 800 for controlling power to modules 202, 204, 206 of a processing system 110. The method 800 begins at step 802 by switching from a first type of capacitive sensing to a second type of capacitive sensing in response to a signal from a host processor while a display driver module is in a sleep mode. At step 804, presence of an object in a sensing region is determined while performing the second type of capacitive sensing. For example, the second type of capacitive sensing may be performed utilizing the transmitter module and receiver module to perform a transcapacitive sensing routine.

At step 806, in response to results obtained during the second type of capacitive sensing, a state of the display driver module is changed from the sleep mode to a display update mode, or the state of the input device is returned to the first type of capacity sensing. For example, if results obtained during the second type of capacitive sensing meet a predefined criteria, such as a gesture or code, the display driver module begins updating images of the display device by entering a display update mode from the sleep mode. Conversely, if results obtained during the second type of capacitive sensing fail to meet a predefined criteria within a predefined time period, the display driver module stays in the sleep mode while the input device return to the first type of capacity sensing.

At step 808, a first type of capacitive sensing may be performed while the display driver and the transmitter driver are in a sleep mode. For example, the input device may switch from the first type of capacitive sensing to the second type of capacitive sensing in response to detection of a presence of an object in the sensing region of the input device at step 804. The second type of capacitive sensing may be performed utilizing the transmitter module and receiver module to perform a transcapacitive sensing routine.

At this point, the method 800 may repeat. Alternatively, the method 500 may be performed as the method 800 ends.

Figure 9:
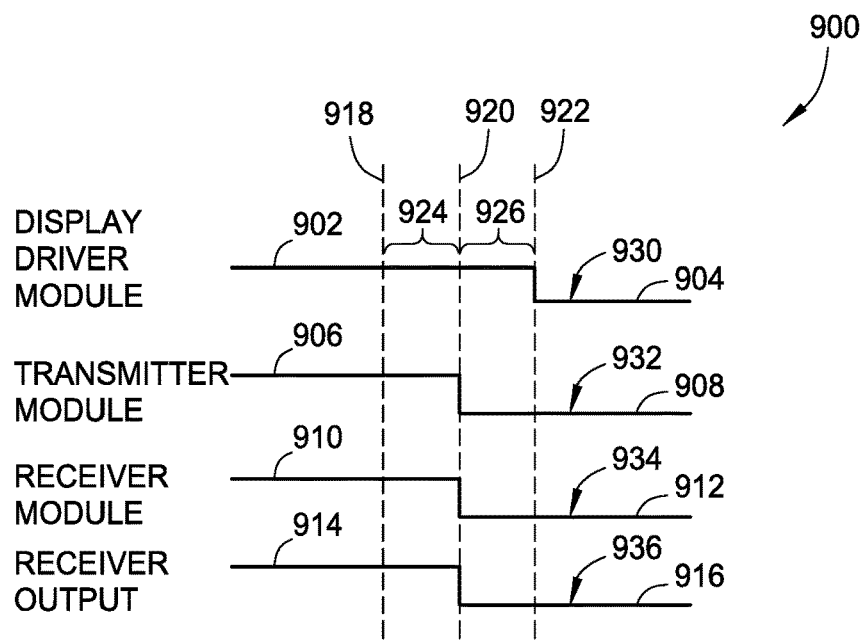
FIG. 9 is a diagram illustrating states of a display driver module, a transmitter module and a receiver module of a processing system in response to a signal from a host processor for the display module to enter a sleep mode.

FIG. 9 is a diagram 900 illustrating states 930, 932, 934 of a display driver module 202, a transmitter module 204 and a receiver module 206 of the processing system 110 through another sequence of events. Time is on the x-axis of the diagram 900, while the states 930, 932, 934 of each module 202, 204, 206 is indicated on the y-axis. A state 936 of the receiver output (i.e., output voltage of the output pin of the receiver module 206 coupled to the transmitter module 204 by the connection 220) is also shown in the diagram 900 of FIG. 9. The sequence of events is illustrative a change in the state of the transmitter module being synchronized with the completion of a display update, which reduces the probability of an appearance of display artifacts.

Initially, the state 930 of the display driver module 202 is in a first display driving state 902, the state 932 of the transmitter module 204 is in a first transmitting state 906 and the state 934 of the receiver module 206 is in a first receiving state 910. In the first transmitting state 906, the transmitter module 204 drives a transmitter sensing signal with the transmitter electrodes 260 while the receiver module 206 receives the resultant signals with the receiver electrodes 270 to perform a transcapacitive sensing routine. In the first display driving state 902, the display driver module 202 is in a display update mode.

While the receiver module 206 is in the first receiving state 910, a first event 918 may occur which may be in the form of an instruction from the host processor 208 for the display driver module 202 and transmitter module 204 of the input object 140 to leave the active mode and enter a sleep mode. The instruction from the host processor 208 is provided at least to the receiver module 206 and the display driver module 202. In response to the first event 918, the display driver module 202 beings a wait-for-sleep period 924 in which the display driver module 202 begins to turn off the display driver circuitry and functions. Communicating through the host processor 208 or directly between the display driver module 202 and the receiver module 206, the state of the receiver module 206 changes from a first receiving state 910 (i.e., an active mode) to a second receiving state 912 (i.e., a doze mode). Upon entering the second receiving state 912, the state 934 of the receiver module 206 changes from being driven to the high voltage state 914 to being driven to a low voltage state 916.

As discussed above, the transmitter module 204 senses the change in the state 936 of the output of the receiver module 206 through the connection 220. In response to the state 936 of the output of receiver module 206 changing from to the low voltage state 916, the state 932 of the transmitter module 204 also changes after the expiration of the wait-for-sleep period 924 from the first transmitting state 906 to a second transmitting state 908. In the second transmitting state 908, the transmitter module 204 is in a sleep mode. That is, the transmitter module 204 is not driving signals with the transmitter electrodes 260 during the first transmitting state 906. In the second receiving state 912, the receiver module 206 enters a doze mode. In the doze mode, the receiver module 206 is driving signals and receiving resulting signals with the receiver electrodes 270 during the second receiving state 912 to perform the first type of sensing, e.g., absolute capacitive sensing. While in the doze mode, the state 936 of the receiver output of the receiver module 206 is driven to a low voltage state 916.

After the wait-for-sleep period 924 has expired, the display driver module 202 updates the display device 160 one last display frame. A second event 922 is defined by the completion of the last display frame being driven onto the display device 160. Generally, a period 926 is defined from the end of the wait-for-sleep period 924 identified by event 920 in FIG. 9 through the completion of the last display frame at event 922. After the completion of the period 926 at the second event 922, the state 930 of the display device 160 changes from first display driving state 902 to a second display driving state 904. In the second display driving state 904, the display driver module 202 enters a sleep mode in which display updates are not longer driven onto the display device 160, thereby conserving input device power. Additionally, waiting for the display driver module 202 to update a complete display frame prior to entering the sleep mode allows the transmitter module 204 to be synchronized with the display driver module 202 immediately upon exiting the sleep mode, thereby reducing potential latency when exiting the low power mode, thereby improving power management efficiency of the input device.

While in receiver module 206 is in the second receiving state 912, the first type of capacitive sensing, i.e., absolute sensing, is utilized to determine an occurrence of an event which signifies that the input device 100 should return to the second type capacitive sensing. For example, the input device 100 may perform the one of method described above to return the input device 100 to an active touch sensing and/or active display updating mode.

Figure 10:
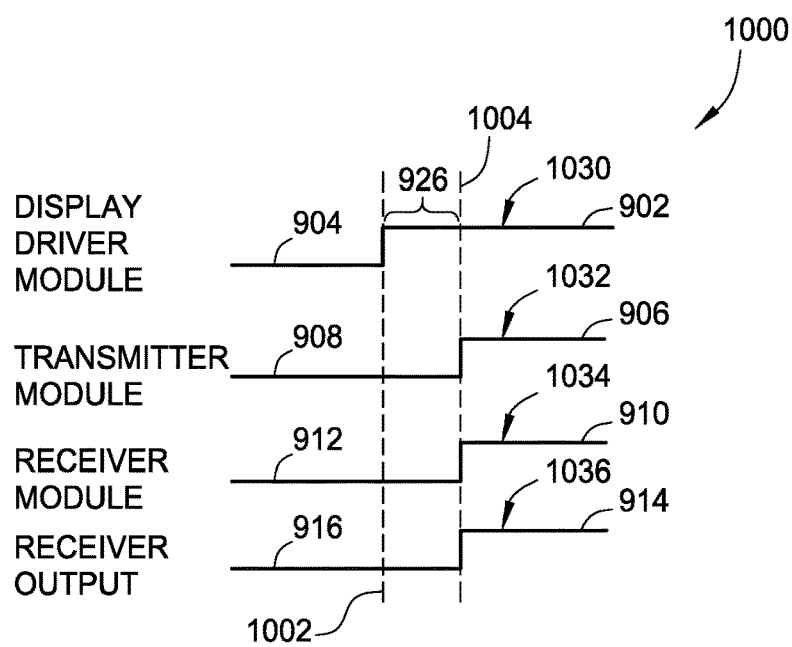
FIG. 10 is a diagram illustrating states of a display driver module, a transmitter module and a receiver module of a processing system in response to a signal from a host processor for the display module to exit a sleep mode.

FIG. 10 is a diagram 1000 illustrating states 1030, 1032, 1034 of a display driver module 202, a transmitter module 204 and a receiver module 206 of the processing system 110 through another sequence of events. Time is on the x-axis of the diagram 1000, while the states 1030, 1032, 1034 of each module 202, 204, 206 is indicated on the y-axis. A state 1036 of the receiver output (i.e., output voltage of the output pin of the receiver module 206 coupled to the transmitter module 204 by the connection 220) is also shown in the diagram 1000 of FIG. 10. The sequence of events is illustrative a change in the state of the transmitter module 204 in response to a signal from a host processor 208 for the display device 160 to exit a sleep mode and enter an active state, the state 1032 of the transmitter module 204 being synchronized with the completion of a display update, which reduces the probability of an appearance of display artifacts.

Initially, the input device 100 is in a sleep mode, such that the state 1030 of the display driver module 202 is in the second display driving state 904, the state 1032 of the transmitter module 204 is in the second transmitting state 908 and the state 1034 of the receiver module 206 is in a second receiving state 912. With the transmitter module 204 and the receiver module 206 in the second states 908, 912, the input device 100 is configured to perform the first type of capacitive sensing, for example, an absolute capacitive sensing routine.

While the receiver module 206 is in the second receiving state 912, a first event 1002 may occur which may be in the form of an instruction from the host processor 208 for the display driver module 202 and transmitter module 204 of the input object 140 to enter the active mode from the sleep mode. The instruction from the host processor 208 is provided at least to the receiver module 206 and the display driver module 202.

In response to the first event 1002, the state 1030 of the display driver module 202 changes from the second display driving state 904 (i.e., sleep mode) to a first display driving state 902 (i.e., active mode). Upon entering the second display driving state 904, the display driver module 202 updates the display device 160 for at least one display frame as indicated by period 926. Once the period 926 is complete at event 1004, the state 1030 of the display driver module 202 remains in the first display driving state 902.

The receiver module 206 is in communication directly with the display driver module 202 or in communication with the display driver module 202 through the host processor 208. In response to the occurrence of event 1004 as communicated from the display driver module 202 or host processor 208, the state 1034 of the receiver module 206 changes from the second receiving state 912 to the first receiving state 910. Accordingly, with the change from the second receiving state 912 to the first receiving state 910, the receiver module 206 drives the state 1036 of the output of the receiver module 206 to a high voltage state 914.

The transmitter module 204, in response to detecting the high voltage state 914 of the receiver module 206 through the connection 220, changes from the second transmitting state 908 to the first transmitting state 906.

In the first transmitting state 906, the transmitter module 204 is in an active mode. That is, the transmitter module 204 is drives signals with the transmitter electrodes 260 during the first transmitting state 906, thereby enabling a second type of sensing, i.e., transcapacitive sensing, to be performed by the input device. As the transmitter module 204 enters the active mode after the display driver module 202 has completed a display update frame, capacitive sensing and display updating are synchronized which beneficially reduces the probability of display artifacts from appearing. Synchronization of sensing data collection to the beginning of a display frame reduces potential latency in exiting the low power modes, thereby providing better efficiency of power management of the input device.

FIGS. 11A-11F are schematic diagrams of capacitive images illustrating an un-lock gesture as a predefined input code configured as a series of taps. As discussed above, the input device 100 may be unlocked upon detection of a series of taps, for example by providing the host processor 208 with a signal from the receiver module 204 if wake up gesture was detected. Although the example is described below with reference to a double tap, i.e., two taps in the sensing region 170, any number of multiple taps may be utilized.

In one embodiment, wake up on a double tap requires includes an input object 140, such as a finger, landing in a predefined area of sensing region 170 twice within a predefined period of time. The predefined period of time may be set by the host processor 208, be user defined, or set in the logic of the receiver module 204. In an initial state, the input device 100 is configured to run in an absolute capacitive sensing mode. In this mode, only the receiver module 204 is active and periodically checking for the presence of an input object 140 using absolute capacitance data obtained from receiver electrodes 270, while the display driver module 202 may be in a sleep mode to conserve power.

Once an input object 140 is detected by the receiver module 204 while operating in the absolute capacitive sensing mode, a signal is provided by the receiver module 204 (and/or determination module 206) to the display driver module 202 directly or through the host processor 208 to power on the display driver module 202 and switch the operation of the input device 100 to a transcapacitive sensing mode. The display driver module 202 then drives a modulated signal on the transmitter electrodes 260 while the receiver electrodes 270 are scanned by the receiver module 204 for transcapacitive image collection. This sequence can be performed while the input object 140, e.g., finger, is still touching the sensing region 170 of the input device 100 after initial landing.

Figure 11A:
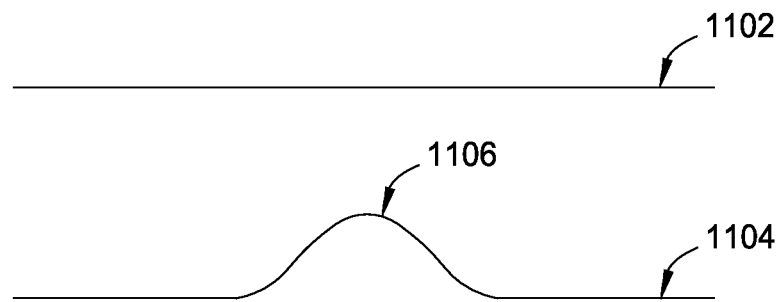
FIGS. 11A-11F are schematic diagrams of capacitive images illustrating an un-lock gesture as predefined input code configured as a series of taps.
Figure 11B:
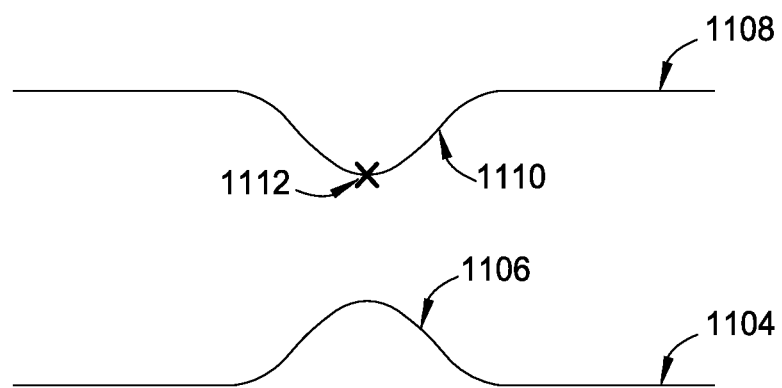

As illustrated in FIG. 11A, the receiver module 204 captures a transcapacitive image for a baseline 1104 which includes a protrusion 1106 indicating the presence of the input object 140 in the sensing region 170. Since the input object 140, e.g., finger, is stationary in the sensing region 170 of the input device 100, the receiver module 204 only detects noise in the delta-image 1102, leaving the delta-image 1102 essentially flat. In FIG. 11A, the vertical axis represents capacitive charge while the horizontal axis represents time.

Figure 11C:
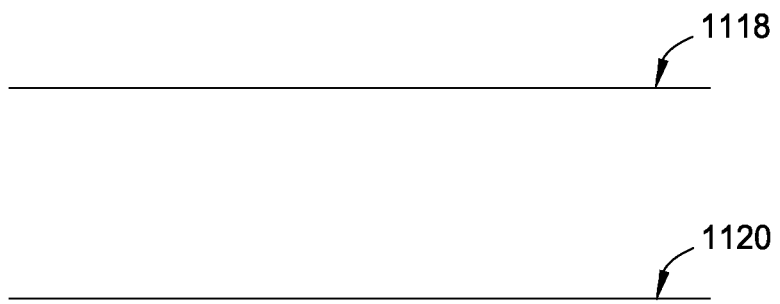

After the input object 140 is lifted, a delta-image 1108 results as shown in FIG. 11C. In the delta-image 1108, a protrusion 1110 is created due to the removal of the input object 104. From this information, the receiver module 204 (and/or determination module 206) may calculates coordinates $(X_1, Y_1)$, represented by reference numeral 1112, indicative of the location from which the input object 140 was removed. The baseline 1104 is provided in FIG. 11B to illustrate the inversion between protrusion 1106 of the baseline 1104 and the protrusion 1110 of the delta-image 1108 indicating the presence and removal of the input object 140.

After input object 140 has been lifted, the baseline can be either recaptured or relaxed at a high rate to eliminate an absorbed response from a first touch. This is illustrated by a delta-image 1118 and a baseline 1120 shown in FIG. 11C.

Figure 11D:
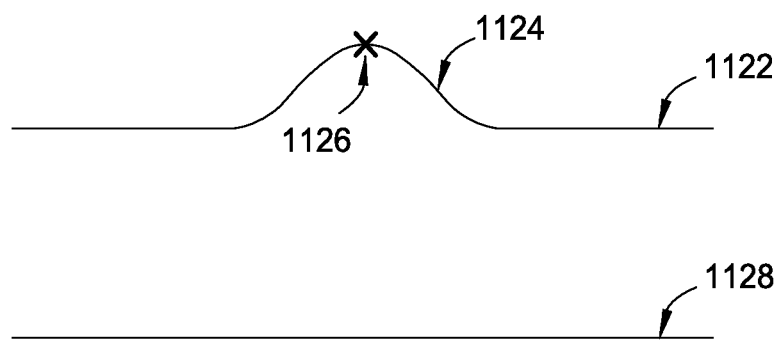
Figure 11E:
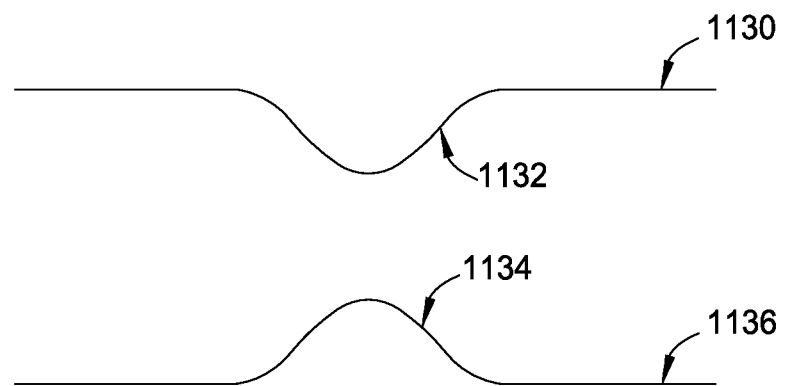

Subsequently, if another input object 140 is not detected within a predetermined period of time after the initial detection of an input object 140, the input device 100 returns to the absolute capacitive sensing mode. If another input object 140 is detected within a predetermined period of time after the initial detection of an input object 140, the receiver module 204 calculates coordinates $(X_2,Y_2)$ from a regular positive response of the input object 140. This is illustrated in FIG. 11D by a delta-image 1122 which includes a protrusion 1124 on which coordinates $(X_2, Y_2)$, represented by reference numeral 1126, indicative of the position of the input object detected utilizing the transcapacitive sensing routine. If the distance between coordinates $(X_1,Y_1)$ and coordinates $(X_2,Y_2)$ fall within a predetermined window, then the predefined input code is considered as being met, and the host processor 208 is provided with a signal from the receiver module 204 that the wake up gesture was detected. The host processor 208 in turn signals the input device 100 to unlock and instructs the display driver module 202 to begin display updating and to continue performing transcapacitive sensing.

Alternatively, relaxation or recapturing of a baseline may not be utilized for the subsequent detection of another input object 140. For example, if the input object 140 is lifted and a baseline 1130 is maintained with no a forced exclusion (removal) of a negative input object in it, as shown by the protrusion 1132 illustrated in FIG. 11E, the subsequent interaction of the input object 140, i.e., a second tap in the sensing region 170, generates a capacitive image 1136 having a protrusion 1134 that is the inverse of the protrusion 1132 of the capacitive image 1130. As double tap is a fast user action, relaxation may not be needed as there will be no significant drift in a baseline due to changes in the environment of the input device 100. Although not quite as reliable as the previous technique, this alternative method provides a simpler implementation which is likely to provide additional power savings when transcapacitive sensing for subsequent input object events, that is for example, the second tap in a double-tap wake up gesture.

Figure 11F:
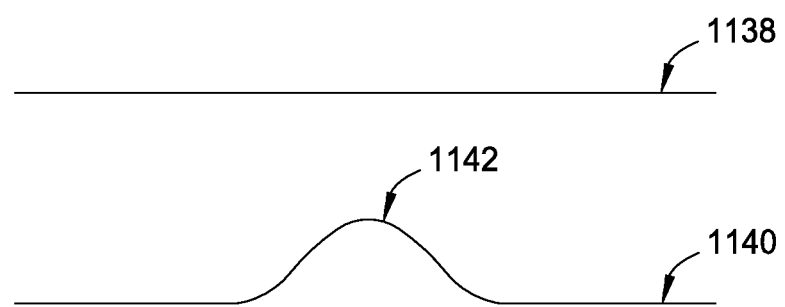

Subsequently, if another input object 140 is not detected within a predetermined period of time after the first detection of an input object 140, the input device returns to the absolute capacitive sensing mode. If another input object 140 is detected within a predetermined period of time after the first detection of an input object 140, the receiver module 204 calculates if the second detection of the input object 140 is within a predefined distance from the location of the detection of the first input object 140, which will indicate that the predefined input code is met and unlocking of the input device 100 may proceed. As illustrated in FIG. 11F, a baseline 1140 will include a protrusion 1142 indicating an absorbed input object, and a delta-image 1138 will be devoid of protrusions with the exception of any noise.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for a display device comprising an integrated sensing device, the processing system comprising:
   a display driver module configured to:
      update a display of the display device with display frames in a display update mode;
      enter a wait-for-sleep period in response to a first instruction; and
      enter a display sleep mode in response to expiration of the wait-for-sleep period and a completion of one of the display frames;
   a receiver module communicatively coupled with the display driver module and configured to:
      receive resulting signals from a first plurality of sensor electrodes, the resulting signals comprising effects corresponding to a presence of an object in a sensing region associated with the first plurality of sensor electrodes; and
      change from a first receiver state to a second receiver state in response to the first instruction and the expiration of the wait-for-sleep period, wherein the second receiver state corresponds to a receiver doze mode, and an output of the receiver module changes from a high voltage state to a low voltage state based on the receiver module entering the second receiver state; and
   a transmitter module communicatively coupled with the receiver module and configured to:
      change from a first transmitter state to a second transmitter state in response to sensing the output of the receiver module changing from the high voltage state to the low voltage state and the expiration of the wait-for-sleep period, wherein the first transmitter state corresponds to an active sensing mode, and the second transmitter state corresponds to a transmitter sleep mode; and enter the active sensing mode from the transmitter sleep mode in response to a trigger signal from the receiver module, wherein the display driver module remains in the display sleep mode and the transmitter module is configured to drive modulated signals onto a second plurality of sensor electrodes in the active sensing mode.

2. The processing system of claim 1, wherein the receiver module is further configured to communicate with a host when a wakeup gesture is identified from the resulting signals while the transmitter module is in the active sensing mode.

3. The processing system of claim 1, wherein the transmitter module is further configured to drive a modulated signal onto a second plurality sensor electrodes for capacitive sensing while the display driver is in the display update mode.

4. The processing system of claim 3, wherein each sensor electrode of the first plurality of sensor electrodes comprises at least one common electrode of a plurality of common electrodes.

5. The processing system of claim 1, wherein the receiver module is further configured to communicate with a host in response to an absence of an input object over a period of time determined from the resulting signals or lack thereof.

6. The processing system of claim 1, wherein the receiver module is further configured to enter the receiver doze mode in response to an absence of an input object in the sensing region of the sensing device over a period of time determined from the resulting signals or lack thereof.

7. The processing system of claim 1, wherein the display driver module is further configured not to drive signals onto the sensor electrodes or update the display while in the display sleep mode.

8. The processing system of claim 1, wherein the transmitter module is further configured, while the display driver module is in the display update mode, to drive the modulated signals onto the second plurality of sensor electrodes for capacitive sensing while also operating in the active sensing mode.

9. The processing system of claim 1, wherein the display driver module and the transmitter module are present within a single integrated circuit.

10. The processing system of claim 1, wherein the display driver module and the transmitter module are disposed in separate integrated circuits.

11. The processing system of claim 1, wherein the display driver module and the receiver module are further configured to receive a second instruction from a host processor, the display driver module configured to enter the display update mode in response to the second instruction, and wherein the receiver module is configured to enter a receiver active mode in response to the second instruction.

12. The processing system of claim 1, wherein the first receiver state corresponds to a receiver active mode, and the receiver module is configured to: operate in an absolute capacitive sensing mode during the receiver doze mode; and operate in a transcapacitive sensing mode during the receiver active mode.

13. The processing system of claim 1, wherein the display device comprises:

a plurality of common electrodes, wherein each sensor electrode of the second plurality of sensor electrodes comprises at least one common electrode of the plurality of common electrodes.

14. The processing system of claim 1, wherein the display module and the receiver module are further configured to receive the instruction from a host.

15. The processing system of claim 1, wherein the receiver module is communicatively coupled with the display driver module such that the receiver module is configured to communicate directly with the display module.

16. A method for operating a display device comprising an integrated sensing device, the method comprising:

updating a display of the display device with display frames while a display module is in a display update mode;

placing the display module in a wait-for-sleep period in response to a first instruction;

placing the display module in a display sleep mode in response to an expiration of the wait-for-sleep period and a completion of one of the display frames;

determining a presence of an object from signals received from first sensor electrodes by a receiver module;

changing the receiver module from a first receiver state to a second receiver state in response to the first instruction and the expiration of the wait-for-sleep period, wherein the second receiver state corresponds to a receiver doze mode, and an output of the receiver module changes from a high voltage state to a low voltage state based on the receiver module entering the second receiver state;

placing a transmitter module in an active sensing mode in response to a trigger signal provided by the receiver module, wherein the display driver module remains in the display sleep mode;

changing the transmitter module from a first transmitter state to a second transmitter state in response to sensing the output of the receiver module changing from the high voltage state to the low voltage state, and the expiration of the wait-for-sleep period, wherein the first transmitter state corresponds to an active sensing mode, and the second transmitter state corresponds to a transmitter sleep mode; and driving modulated signals from the transmitter module onto second sensor electrodes of the capacitive sensing device while in the active sensing mode.

17. The method of claim 16 further comprising:

switching the display driver module from the display sleep mode to the display update mode in response to a determination made using resultant signals received by the receiver module while the transmitter module is in the active sensing mode and the receiver module is in a second capacitive sensing mode; and updating images on the display device with the display driver module and driving transmitter signals from the transmitter module onto the second sensor electrodes for capacitive sensing while the transmitter module is in the active sensing mode.

18. The method of claim 16 further comprising:

changing the output state of the receiver module from the second receiver state to the first receiver state in response to determining a lack of presence of an object from signals received from the first sensor electrodes by the receiver module operating in a second capacitive sensing mode.

19. The method of claim 16, wherein the first instruction is received from a host processor.

20. The method of claim 16 comprising:
driving the modulated signals onto one or more common electrodes while the transmitter module is in the active sensing mode.

* * * * *